Feb. 3, 1959 — A. G. LOOFBOURROW — 2,871,907
VALVE STRUCTURE
Filed Nov. 26, 1954
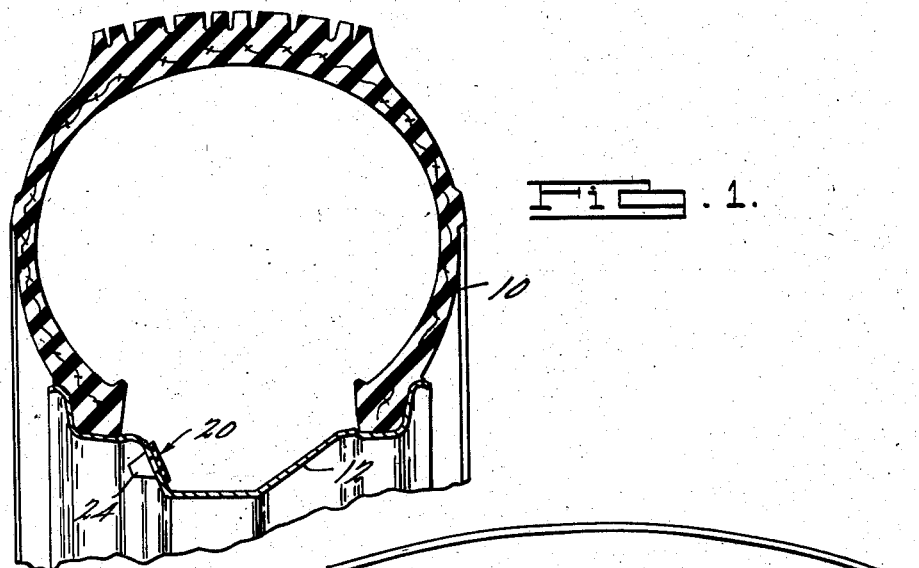
Fig. 1.
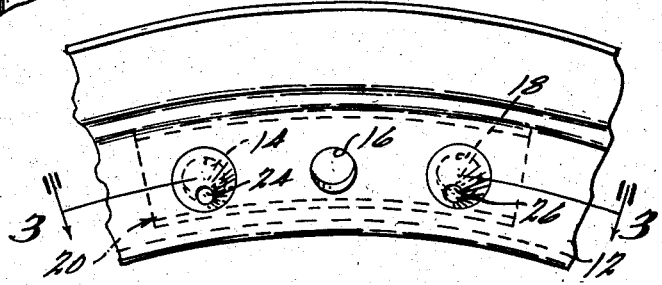
Fig. 2.
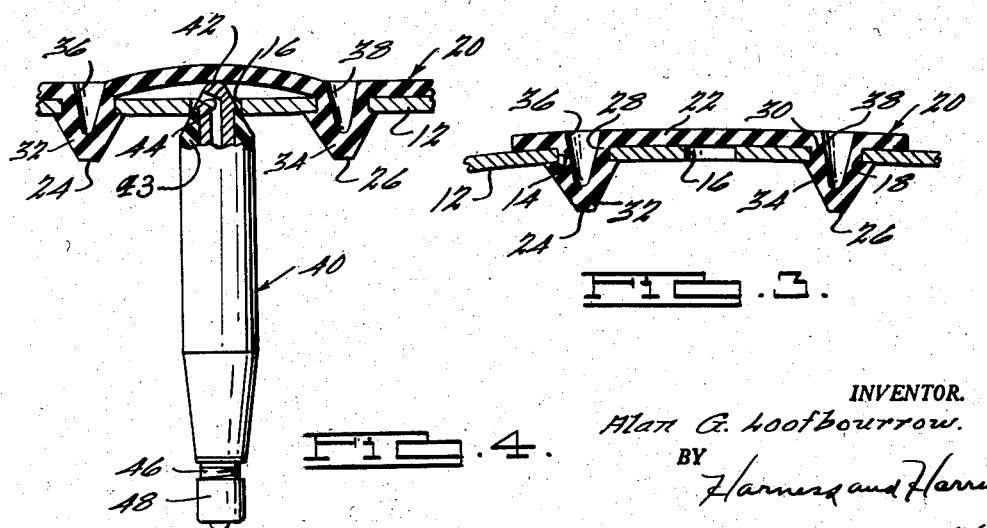
Fig. 3.
Fig. 4.
INVENTOR.
Alan G. Loofbourrow.
BY Harness and Harris
ATTORNEYS

United States Patent Office 2,871,907
Patented Feb. 3, 1959

2,871,907

VALVE STRUCTURE

Alan G. Loofbourrow, Bloomfield Hills, Mich., assignor to Chrysler Corporation, Highland Park, Mich., a corporation of Delaware Application November 26, 1954, Serial No. 471,301

1 Claim. (Cl. 152—427)

The present invention relates to vehicle tires and the like and has particular reference to the type of tire known in the art as a tubeless tire.

In the past tubeless tires have presented problems in view of the fact that no inner tube is utilized and some satisfactory method of introducing air into the tire had to be found. The principal object of this invention is to provide a tubeless tire structure with improved valve means for the purpose of introducing and holding air in the tire.

A further object of the invention is to provide a novel valve structure which is particularly characterized by its simplicity.

Still a further object of the invention is to provide an improved valve means for a tubeless tire which is extremely economical to manufacture compared to other types of valves known in the art.

More particularly, the present invention relates to a novel valve means for a tubeless tire wherein the valve means is attached to the vehicle tire rim. The rim is provided with three laterally aligned openings. The end openings receive rubber-like buttons which are connected by an integral rubber strip. The strip is disposed on the proper side of the rim so as to be disposed within the tubeless tire and covers the middle opening of the aforementioned three openings. This middle opening is the one through which air is received for the tire.

Other objects and advantages will become more apparent from the following description of one embodiment of the invention, reference being had to the accompanying drawings in which:

Fig. 1 is a cross sectional view of a tubeless tire and rim assembly showing the present invention applied thereto.

Fig. 2 is an elevational view of a side of the tire rim taken in the direction of the arrow 2 shown in Fig. 1 and illustrating the invention.

Fig. 3 is a cross sectional view taken on the line 3—3 of Fig. 2.

Fig. 4 is a sectional view similar to Fig. 3 showing the application of an adapter.

Referring now to the drawings, I have shown a tubeless tire 10 of the conventional type which is mounted on a wheel rim 12. The rim 12 adjacent one edge of the tire 10 is provided with three circumferentially aligned circular openings 14, 16 and 18. The aforementioned openings are provided in the rim 12 to receive a valve structure generally designated by the numeral 20.

The valve structure 20 comprises a base portion 22 of slightly arced strip material formed of yieldable material such as natural or synthetic rubber. The base portion 22 is slightly arced to conform to the curvature of the rim at the location where the valve structure is applied. The base portion 22 is provided with two integral buttons 24 and 26 which extend in the same direction from opposite ends of the base portion 22.

The buttons 24 and 26, when applied, extend through the openings 14 and 18 to secure the valve structure to the rim 12, respectively. The buttons 24 and 26 include neck portions 28 and 30 which are disposed in the openings 14 and 18 and head portions 32 and 34 which clampingly engage the rim 12 adjacent the openings 14 and 18 on the opposite side of the rim from the base portion 22, respectively. The buttons 24 and 26 not only secure the valve structure 20 to the rim 12 but also sealingly engage the rim adjacent the openings 14 and 18 so that air from within the tire structure does not escape.

As more clearly seen in Fig. 3 the central part of the base portion 22 completely covers the opening 16. In accordance with my invention, air pressure within the tire 10 maintains the base portion 22 against the opening 16 to thereby prevent the escapement of air from within the tire.

In order that the conventional type of air hose mechanism may be used to inflate the tire, I have provided an adapter generally designated by the numeral 40. The adapter 40 includes a nose portion 42 which may be inserted through the opening 16 to engage the base portion 22 and thereby lift the same against the pressure of the air within the tire as more clearly shown in Fig. 4. By this adaptation air may be put in or taken out of the tire. The adapter 40 is provided with a rubber jacket 43 which is adapted to engage the rim adjacent and partially in the opening 16 to thereby seal the aforementioned opening when the adapter is applied. The adapter 40 is provided with a longitudinally extending centrally disposed passage 44 which connects the nose portion 42 with the nozzle portion 46. The nozzle portion 46 is constructed, preferably, like a conventional air inlet mechanism found on tires having tubes so that a conventional air hose may be applied thereto. A cap 48 is provided to prevent the influx of foreign matter into the adapter.

To apply my improved valve structure 20 to the rim 12, the base portion 22 is provided with recesses 36 and 38 which extend through the base portion into the buttons 24 and 26, respectively. By inserting a rod-like instrument (not shown) into the recesses the buttons may be sufficiently stretched so that they will conveniently pass through the openings 14 and 18 to thereby secure the valve structure 20 in place.

By utilizing my improved structure, it will be obvious that a great reduction in cost may be had compared with conventional valve structures known in the art. The characteristic of simplicity is also greatly emphasized by my invention in view of the fact that the valve structure consists of only one piece.

While I have illustrated and described but one embodiment of my invention, it is to be understood that such is for the purpose of illustration only, and it is contemplated that those skilled in the art may modify certain details without departing from the spirit or scope of the invention as defined in the claim appended hereto.

I claim:

A vehicle wheel structure comprising a rim having first, second and third circumferentially aligned openings, a tubeless tire carried by said rim, and valve means formed of yieldable material having a flat strip-like body portion lying against said rim over said openings and having oppositely disposed integrally connected button means extending through said first and third openings to thereby secure said body portion to said rim member and to close said second opening to prevent the escapement of air from within said tire, said valve means being in direct communication with the inside of said tire so that air pressure within said tire will urge said body portion flatly against said rim to thereby seal said openings, said second opening being in direct communication with the exterior of said wheel structure to facilitate the addition of air under pressure into said wheel structure.

References Cited in the file of this patent

UNITED STATES PATENTS

| | | |
|---|---|---|
| 2,429,984 | Berglund | Nov. 4, 1947 |
| 2,586,455 | Coskey | Feb. 19, 1952 |
| 2,634,785 | Tubbs | Apr. 14, 1953 |